US010403250B2

(12) United States Patent
Rodriguez

(10) Patent No.: US 10,403,250 B2
(45) Date of Patent: Sep. 3, 2019

(54) INTERACTIVE PERFORMANCE DIRECTION FOR A SIMULTANEOUS MULTI-TONE INSTRUMENT

(71) Applicant: Jennifer Gonzalez Rodriguez, Chula Vista, CA (US)

(72) Inventor: Jennifer Gonzalez Rodriguez, Chula Vista, CA (US)

(*) Notice: Subject to any disclaimer, the term of this patent is extended or adjusted under 35 U.S.C. 154(b) by 0 days.

(21) Appl. No.: 14/798,317

(22) Filed: Jul. 13, 2015

(65) Prior Publication Data

US 2016/0019810 A1 Jan. 21, 2016

Related U.S. Application Data

(60) Provisional application No. 62/025,276, filed on Jul. 16, 2014.

(51) Int. Cl.

| | |
|---|---|
| ***G09B 15/08*** | (2006.01) |
| ***G10H 1/00*** | (2006.01) |
| ***G09B 15/00*** | (2006.01) |
| ***G06F 3/0484*** | (2013.01) |
| ***G06F 3/16*** | (2006.01) |
| ***G10H 1/18*** | (2006.01) |
| ***G10H 1/20*** | (2006.01) |
| ***G06F 3/0481*** | (2013.01) |

(52) U.S. Cl.

CPC ......... *G10H 1/0008* (2013.01); *G06F 3/0484* (2013.01); *G06F 3/04817* (2013.01); *G06F 3/165* (2013.01); *G09B 15/009* (2013.01); *G10H 1/18* (2013.01); *G10H 1/20* (2013.01); *G10H 2210/081* (2013.01); *G10H 2220/011* (2013.01); *G10H 2220/106* (2013.01); *G10H 2220/131* (2013.01)

(58) Field of Classification Search

CPC ...... G09B 15/009; G06F 3/0484; G06F 3/165
USPC ............................................................ 84/478
See application file for complete search history.

(56) References Cited

U.S. PATENT DOCUMENTS

| | | | | |
|---|---|---|---|---|
| 529,928 | A * | 11/1894 | Lyle | G09B 1/00 84/478 |
| 5,546,843 | A * | 8/1996 | Degaard | G09B 15/006 84/478 |
| 6,639,139 | B2 | 10/2003 | Muller | |
| 6,831,220 | B2 * | 12/2004 | Varme | G10G 1/00 84/464 R |
| 7,041,891 | B2 | 5/2006 | Smith Carter | |
| 7,168,525 | B1 | 1/2007 | Jacobs | |
| 8,304,642 | B1 | 11/2012 | Bryan | |
| 8,321,041 | B2 | 11/2012 | Jellison, Jr. et al. | |
| 8,455,747 | B2 | 6/2013 | Lozano, Jr. | |
| 8,704,066 | B2 | 4/2014 | Jacobsen | |

(Continued)

*Primary Examiner* — Jianchun Qin
(74) *Attorney, Agent, or Firm* — Genius Patent APC; Bruce Hare

(57) ABSTRACT

A musical instrument performance solution is described. Labels with visual indicators provide a reference to performers such that a proper combination of instrument inputs may be selected at the appropriate time. The visual indicators include colors and/or shapes. The visual indicators may be presented using differently-colored lyrical text, where each color corresponds to a set of notes. Each set of notes may for a chordal group such as a triad. The visual indicators may be associated with labels that are able to be adhered to various instrument inputs such as keys of a keyboard or piano.

7 Claims, 6 Drawing Sheets

(56) References Cited

U.S. PATENT DOCUMENTS

| | | | | |
|---|---|---|---|---|
| 2002/0050206 | A1 | 5/2002 | MacCutcheon | |
| 2005/0005761 | A1* | 1/2005 | Knudsen | G09B 15/08<br>84/645 |
| 2007/0137466 | A1 | 6/2007 | Lindemann | |
| 2012/0289336 | A1* | 11/2012 | Matsuda | G06F 3/0219<br>463/37 |
| 2014/0305284 | A1* | 10/2014 | Cosgrove | G09B 15/001<br>84/478 |

* cited by examiner

INTERACTIVE PERFORMANCE DIRECTION FOR A SIMULTANEOUS MULTI-TONE INSTRUMENT

CROSS-REFERENCE TO RELATED APPLICATIONS

This application claims priority to U.S. Provisional Patent Application Ser. No. 62/025,276, filed on Jul. 16, 2014.

BACKGROUND

Various ways to learn to play an instrument are available. For instance, many users may receive person instruction, utilize playbooks or other study materials, review video or audio lessons, etc.

Such methods are time-consuming, expensive and boring. Existing solutions require users to master concepts and theory and/or include practice materials that are not current or interesting to the student.

Thus there is a need for a solution where a user is able to quickly, cheaply, and easily play a variety of materials without having to master theory, practice exercises, or carry out other non-performance related endeavors. In addition, such a solution should eliminate the need for fluency in any particular language.

SUMMARY

Some embodiments provide ways to play simultaneous multi-tone instruments without requiring hours of practice or any understanding of music theory. Some embodiments provide a labelling kit. Such a labelling kit may be able to be applied to various appropriate features of an instrument (e.g., keys of a piano or other keyboard, frets of a guitar, etc.). The labelling kit may include coordinated elements (e.g., multiple elements may share a common color, arrangement, etc.).

Some embodiments may provide accompanying media content that has been optimized for use with the labelling elements. Such content may include, for instance, printed content, content displayed via a web resource, content displayed via an application or app, etc.

The content may be retrieved from various sources and optimized for use with the labelling elements. The content may be optimized in various appropriate ways, where such optimization may depend on the source or type of content. Optimized content may be presented to a user with various cues (e.g., visual cues, audio cues, etc.) that correspond to elements of the labelling kit. For instance, cues may include displayed colors and/or shapes that correspond to various label elements. A user may interpret the cues by selecting the instrument elements or locations that correspond to the appropriate labels.

Users may be able to select from among various performance levels (e.g., lesson, beginner, intermediate, expert, etc.). Such selection may at least partially direct the information provided to the user. For instance, a beginner (or user that selects a particular lesson or lesson type) may be presented with only a bass line (or melody, or chord progression) of a song, rather than all elements.

Some embodiments may provide optimized content via a graphical user interface (GUI). Such a GUI may be provided via an appropriate user device (e.g., a personal computer or “PC”, tablet, smartphone, television or “TV”, etc.). Optimized content may be distributed by various network-connected resources (and/or other appropriate resources).

The preceding Summary is intended to serve as a brief introduction to various features of some exemplary embodiments. Other embodiments may be implemented in other specific forms without departing from the spirit of the disclosure.

BRIEF DESCRIPTION OF THE SEVERAL VIEWS OF THE DRAWINGS

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various inventive features are described below that can each be used independently of one another or in combination with other features. Broadly, some embodiments generally provide ways to perform using a multi-tone instrument. Some embodiments may include various labelling features that may each be associated with various elements or locations of an instrument (e.g., keys of a piano). In addition, some embodiments may provide content that includes various cues associated with the labelling features such that a user is directed as to which elements of the instrument should be manipulated at which time.

Several more detailed embodiments are described in the sections below. Section I provides a description of a labelling kit provided by some embodiments. Section II then describes a system architecture of some embodiments. Next, Section III describes a user interface provided by some embodiments. Section IV then describes methods of operation used by some embodiments. Next, Section V describes various alternative usage scenarios of some embodiments. Lastly, Section VI describes a computer system which implements some embodiments.

I. Labelling Features

Figure 1:
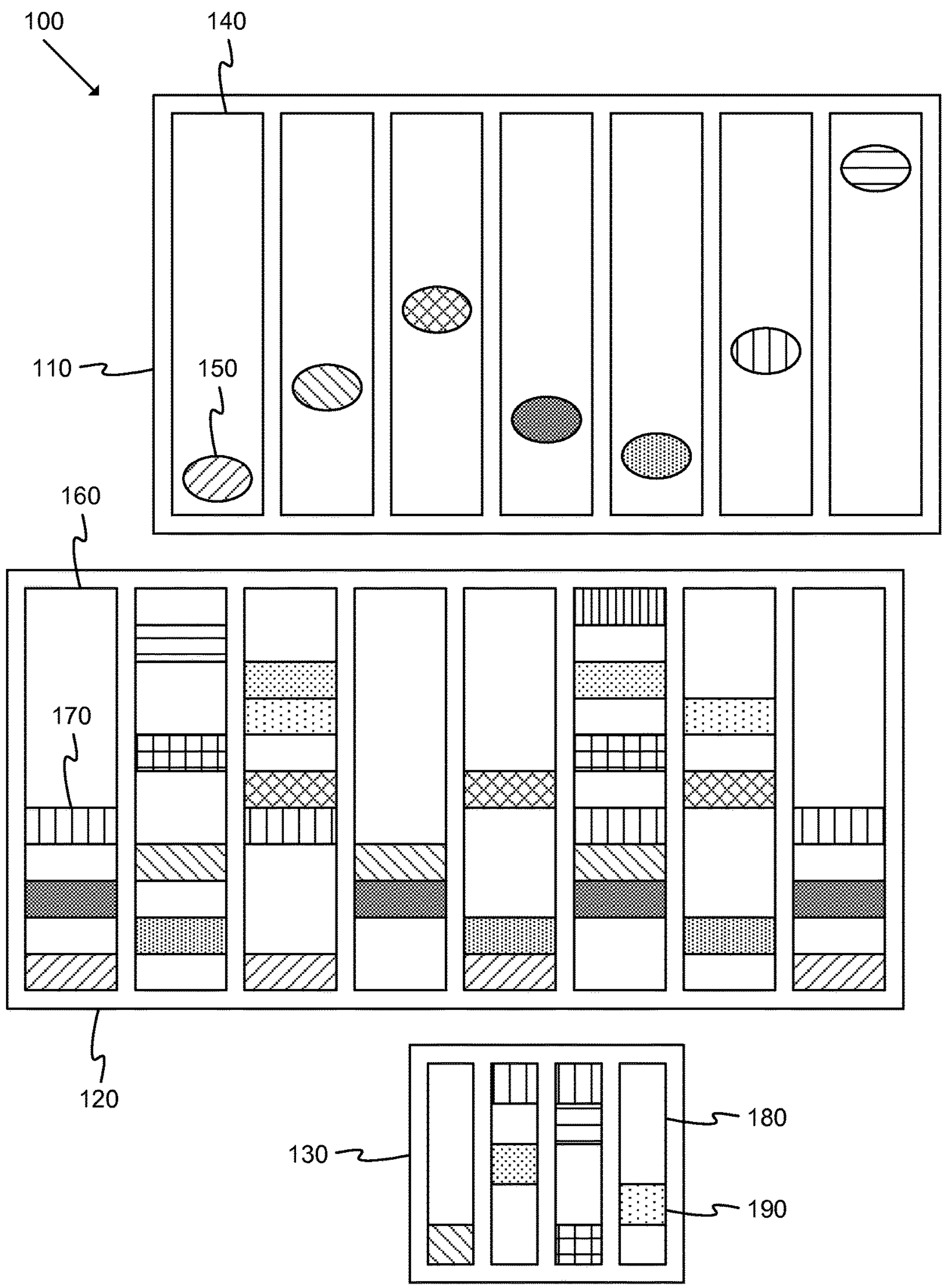
FIG. 1 illustrates a facing view of a labelling kit of some embodiments.

FIG. 1 illustrates a facing view of a labelling kit 100 of some embodiments. In this example, and various examples and description that follow, a piano or other keyboard instrument may be used. One of ordinary skill in the art will recognize that various elements of the disclosure may be implemented with various other types of simultaneous multi-tone instruments (e.g., strings, percussion, etc.). Furthermore, some embodiments may be utilized with singletone instruments (e.g., brass, woodwinds, etc.) in a similar manner to that described in reference to simultaneous multi-tone instruments. In addition, different sets of labels may be provided for different types of music, different key structures, etc.

In this example, the labelling kit includes a first set of label elements 110, a second set of label elements 120, and a third set of label elements 130. Different embodiments may include different numbers and/types of sets of elements.

The first set of label elements 110 may include a number of elements 140 including various visual cues 150. The first set of label elements 110 may be applied to a first set of keys of a piano (and/or other input elements associated with other instruments). In this example, the first set of label elements may be associated with keys played using the left hand (also referred to herein as "bass" keys).

The visual cues 150 are represented as ovals with different fill patterns. Various different shapes (e.g., round, square, polygonal, irregular, etc.) may be used. Such cues may have various patterns or other identifiers (e.g., color, texture, etc.). Each label element 140 may be sized appropriately for the corresponding instrument element (e.g., the "white" keys corresponding to the natural notes of a C major scale).

The second set of label elements 120 may include elements 160 with various visual cues 170. The second set of label elements 120 may be applied to a second set of keys of a piano (and/or other input elements associated with other instruments). In this example, the second set of label elements 120 may be associated with keys played using the right hand (also referred to herein as "harmony" keys).

The visual cues 170 are represented as rectangles with different fill patterns. The fill patterns may correspond to the fill patterns associated with cues 150. As above, the cues 170 may have various patterns or identifiers. Each label element 160 may be sized appropriately for the corresponding instrument element (e.g., the "white" keys corresponding to the notes of a C major scale).

The third set of label elements 130 may include elements 180 with various visual cues 190. The third set of label elements 130 may be applied to a third set of keys of a piano (and/or other input elements associated with other instruments). The third set of label elements in this example may also be associated with keys played using the right hand.

The visual cues 180 are represented as rectangles with different fill patterns. The fill patterns may correspond to the fill patterns associated with cues 150 and 170. As above, the cues 180 may have various patterns or identifiers. Each label element 190 may be sized appropriately for the corresponding instrument element (e.g., the "black" keys corresponding to the notes not included in a C major scale).

The various label elements 140, 160, and 180 may include exposed surfaces that are laminated and/or otherwise protected against wear when a user manipulates an instrument control element associated with a label. In addition, each label element may include various adhesives that may allow the element to adhere to the instrument control element. As another example, each label element may include materials that automatically adhere or "cling" to a surface associated with the instrument (e.g., cling form labels may be able to adhere to ivory, plastic, and/or other typical keyboard materials without affecting the finish of the keys). Each label may be adhered such that the label does not slide or peel during use. Some embodiments may include labels with double-sided laminates that help prevent bleed into the keys and fading from use.

The kit 100 of FIG. 1 is presented for exemplary purposes. Such a kit may be implemented in various different ways without departing from the scope of the disclosure. For instance, different numbers of elements, different shapes or colors of cues, etc. may be used. As another example, different instruments may be associated with different kits.

Figure 2:
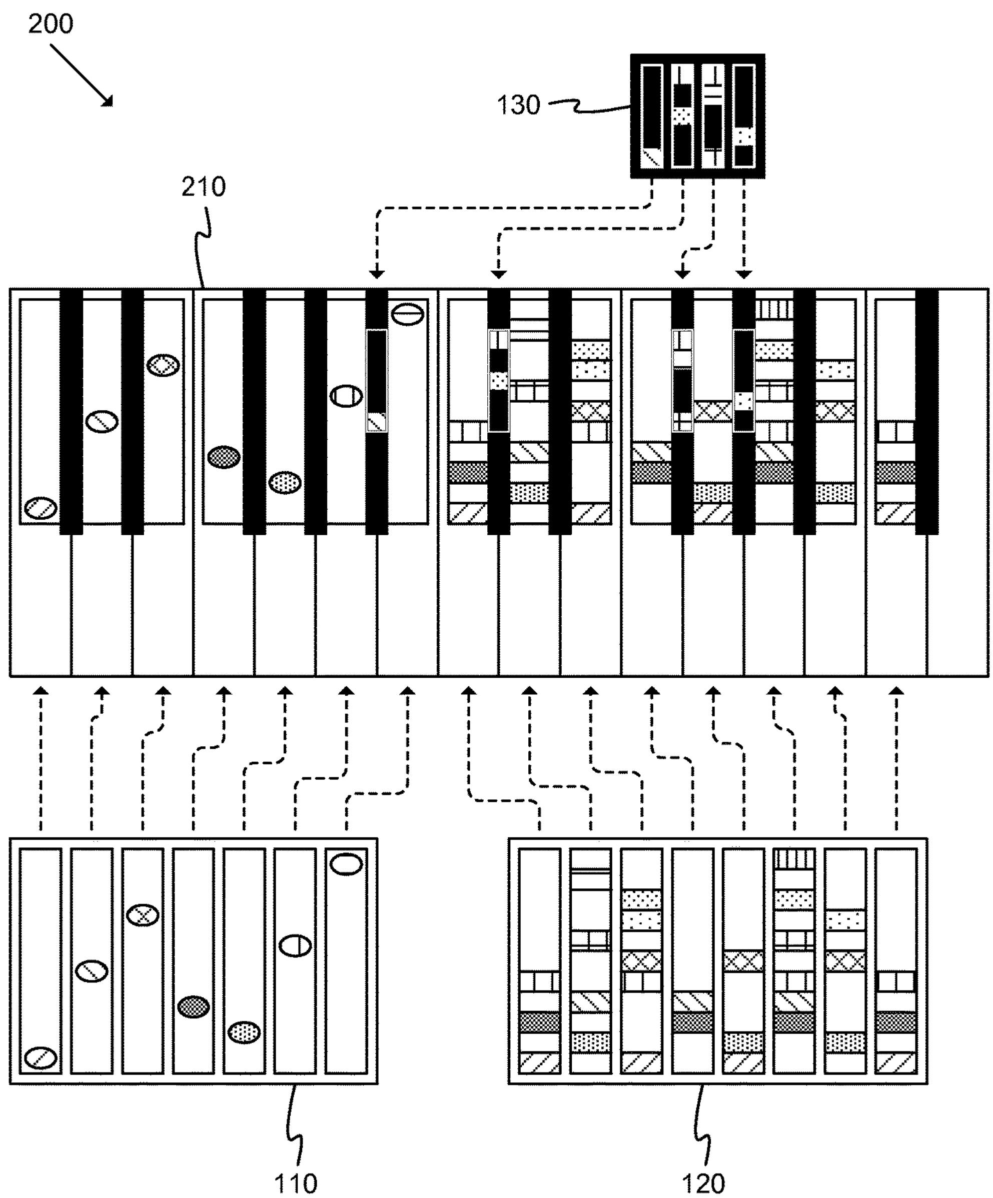
FIG. 2 illustrates a top view of a labelling kit of some embodiments after application to a keyboard.

FIG. 2 illustrates a top view of a labelling kit 200 of some embodiments after application to a keyboard 210. Such a kit 200 may be similar to kit 100 described above.

In this example, the third set of label elements 130 has a black background to correspond to the black keys of the keyboard 210. Different embodiments may include labels of different shape, size, background, etc.

In this example, placement of each element is indicated by the dashed arrows. The section of keyboard 210 may begin at lower C (i.e., the C below middle C) and extend to the second D above middle C. The first set of labels 110 may be applied sequentially beginning at lower C and the second set of labels 120 may be applied sequentially beginning at middle C. The third set of labels 130 may be applied as shown. In this example, the "base key" is C major (or A minor).

Different embodiments may include different groups and/or configurations of labels that may be applied in various different ways than shown. In addition, some embodiments may include multiple iterations of each label set such that, for instance, multiple additional intervals may be able to be placed along the keyboard.

The labels may be configured such that each color (or fill, texture, etc.) is associated with a note or set of notes. In this example, the first set of elements 110 may each be associated with a single note, starting from lower C (which may generally define the base key or performance key of the tune). The second set of elements 120 may include labels associated with various sets of notes. For instance, the sets of notes may be arranged to define major triads, minor triads, etc. The sets of notes may correspond, such that a color from the first set of elements 110 and a color from the second set of elements 120 define related notes (or "chords"). The third set of elements 130 may likewise be associated with various note combinations or chords that may be specified using a single color (and/or other reference).

In some embodiments, multiple colors may be associated. For instance, a yellow bass note may be associated with dark yellow and light yellow harmony notes, where the dark and light yellow may represent chord variations that use the same bass note (e.g., a major triad and a minor triad).

II. System Architecture

Figure 3:
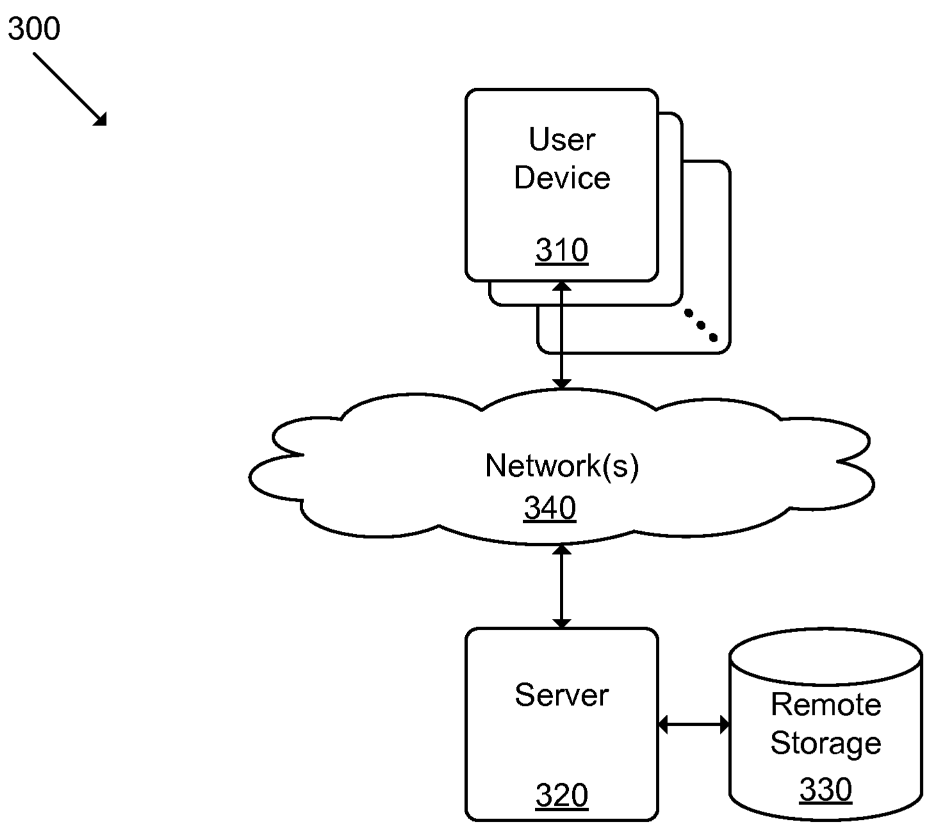
FIG. 3 illustrates a schematic block diagram of an interactive system of some embodiments.

FIG. 3 illustrates a schematic block diagram of an interactive system 300 of some embodiments. Such a system may be used in conjunction with a kit such as kit 100. The system may include one or more user devices 310, a server 320, a storage 330, and/or a network 340.

Each user device 310 may be a device such as a tablet, smartphone, PC, etc. The user device may include a display and/or various interface elements (e.g., touch screen inputs, buttons, keypads, audio inputs, etc.). Each user device may be able to communicate across network 340 to retrieve content from server 320.

The server may be able to store and retrieve content from storage 330. The server 320 may be able to communicate with multiple user devices 310 across network 340. The storage 330 may be able to store content, instructions, data, etc. The storage may be associated with an external system and be accessed via an appropriate interface (e.g., an application programming interface or "API").

The network 340 may include various wired and/or wireless networks. For instance, the network may include one or more local-area networks (e.g., Ethernet, WiFi, etc.), one or more extended-area networks (e.g., cellular networks, the Internet, etc.), and/or various other communication pathways (e.g., wired connections, transferable storages, etc.).

During operation, various users may access the system via user devices 310 across network 340. The server 320 may provide and/or generate content optimized for use with the labelling kit of some embodiments.

III. User Interface

Figure 4:
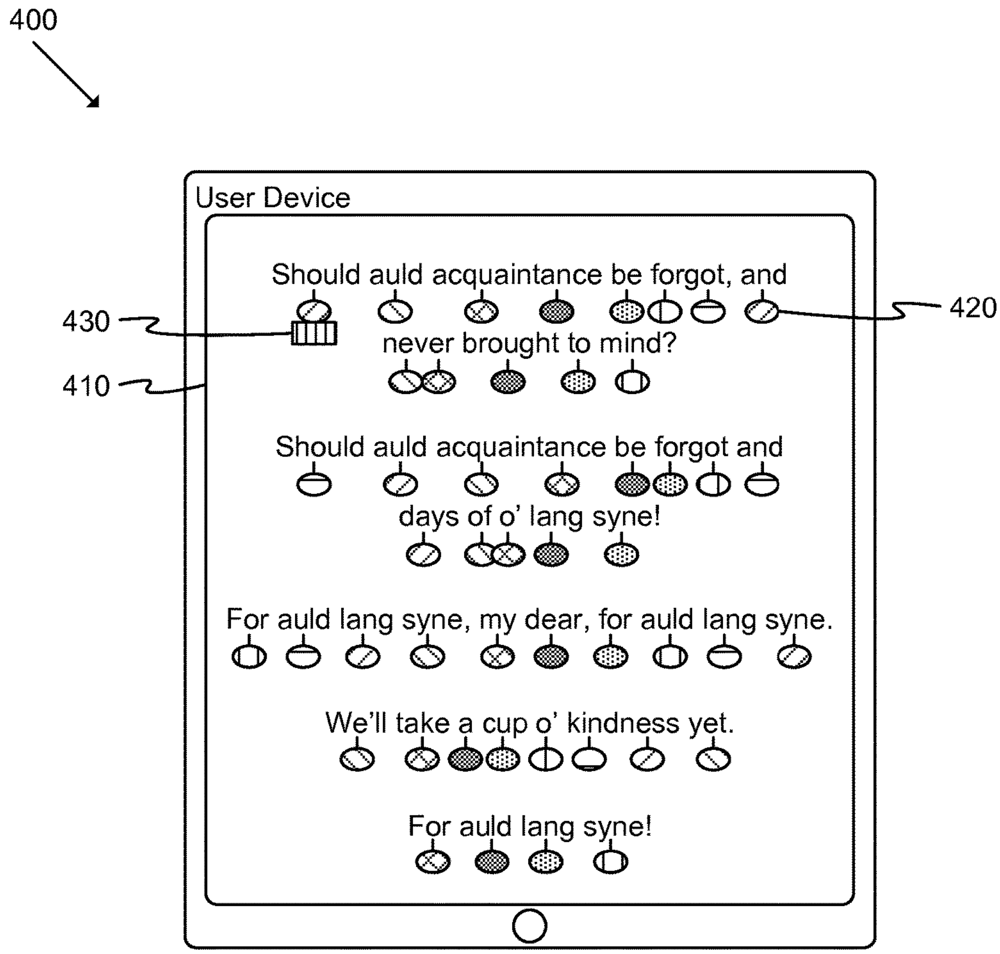
FIG. 4 illustrates a graphical user interface (GUI) used by some embodiments during an interactive performance session.

FIG. 4 illustrates a graphical user interface (GUI) 400 used by some embodiments during an interactive performance session. Such a GUI may be provided by a device such as user device 310. In this example, the user device may be a tablet with a touch screen display 410. GUI 400 is provided for example purposes only and the specified notes do not correspond to any actual tune.

As shown, the display may include lyrics and/or other elements associated with some media content. In addition, this example includes indicators 420 and 430 that may be used to show which labelled instrument elements to activate at each point within the media content. Alternatively, some embodiments may include colored text that corresponds to the various label colors. Thus, as the color of the lyric text changes, the user may play corresponding notes on the keyboard. Some embodiments may use a single color to define all notes (bass and harmony), while other embodiments may allow for multiple colors to be specified (e.g., indicator 420 may be used to indicate a bass note, while indicator 430 indicates a set of harmony notes).

Different indicators (e.g., differently shaped, colored, and/or otherwise differentiated) indicators may be used to designate the appropriate label elements to activate. The indicators may be displayed and/or spaced at various appropriate intervals to indicate execution time.

Different embodiments may present the directions in various different ways (e.g., by providing cues along a timeline, by providing audio cues, by including a moving indicator showing a position along the lyrics, etc.).

In addition, a user may be able to control the presentation in various appropriate ways (e.g., by pausing or stopping playback, by slowing playback, etc.). A user may be able to select a portion of the media content for repeated playback and practice.

Some embodiments may provide links to additional resources, such as example use videos, related content items, etc. For instance, one element may link to an original video and/or streaming music resource associated with a song. Such a resource may allow a user to call up the original song as a guide during practice or performance and use the original song to strengthen ear training, observer technique, etc.

As another example, a different element may link to an instructional video. Such videos may offer short cuts to create a rhythm, arpeggiation or other pronunciation using the labelling system of some embodiments. In this way, users may be able to identify the needed keys for a particular song, indirectly memorize commonly used keys, and hasten the piano experience.

IV. Methods of Operation

Figure 5:
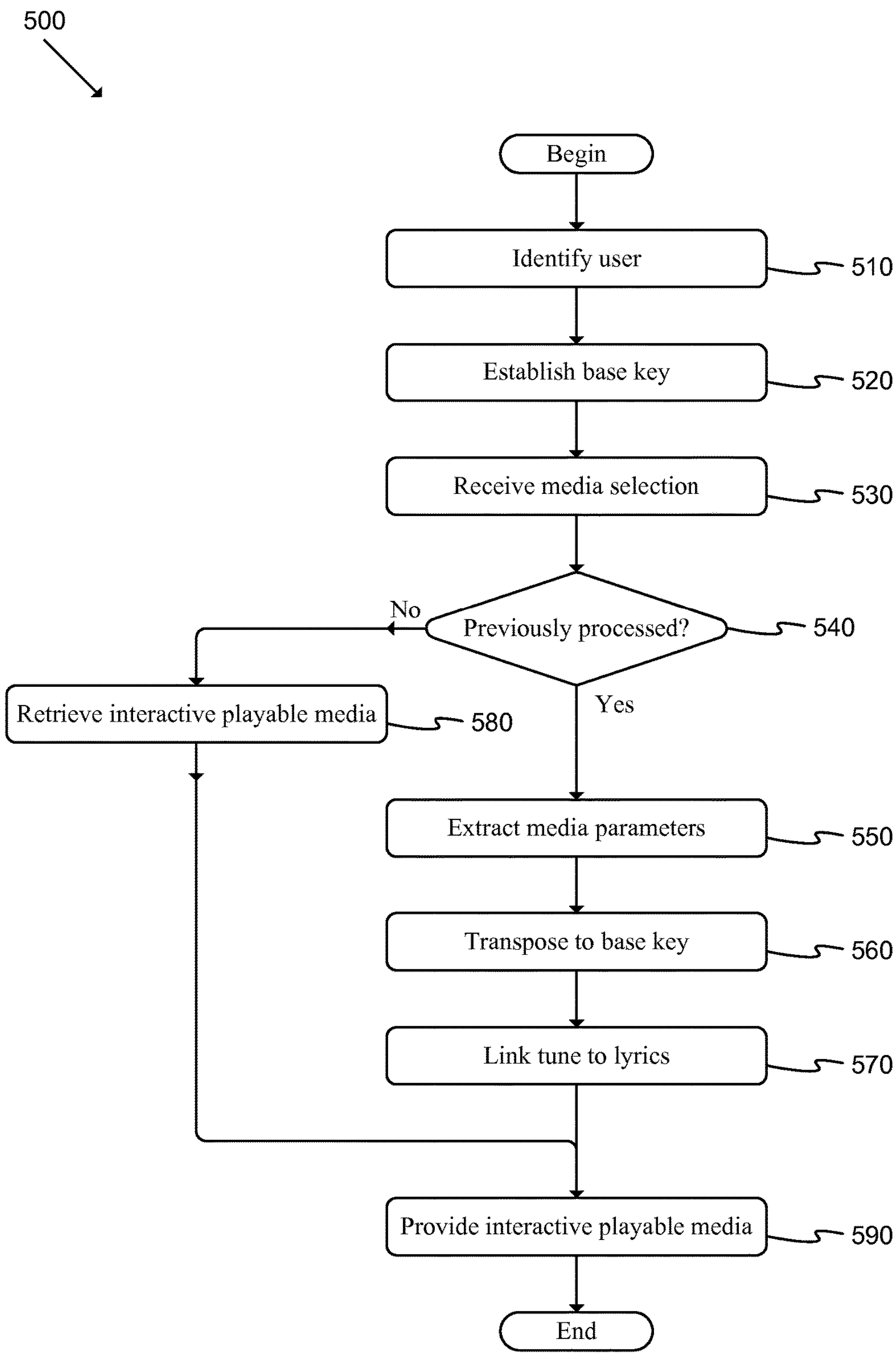
FIG. 5 illustrates a flow chart of an exemplary process used by some embodiments to provide interactive content for playback.

FIG. 5 illustrates a flow chart of an exemplary process 500 used by some embodiments to provide interactive content for playback. Such a process may be executed by a device such as user device 310 which may work in conjunction with server 320 and/or other system elements. The process may begin, for instance, when a user accesses a web resource of some embodiments, launches an app, etc.

When a user first accesses the system resource, some embodiments may register and subscribe the user. The user may then be able to access a catalog of songs (e.g., songs placed in remote storage 330).

As shown, process 500 may identify (at 510) a user and/or a set of attributes. The user may be associated with a username and password, for instance. The attributes may include instrument type, user performance level, biographical information, etc. In addition, the user attributes may include information such as preferred styles, artists, etc.

Next, the process may establish (at 520) a base key. Such a base key may be selected based on various relevant criteria, including, for instance, instrument type, user preference, style, etc. The process may then receive (at 530) a selection of some media item (e.g., a song, tune, etc.). Such a selection may be received using various appropriate GUI elements (e.g., displayed lists, menus, etc.).

The process may then determine (at 540) whether the media item has previously been processed using appropriate attributes for the current user (e.g., instrument type, user level, etc.). In some embodiments, only previously-processed items may be provided for selection. In such cases, content may be identified and processed based on various relevant criteria.

If the process determines (at 540) that the media item has not been previously processed, the process may extract (at 550) media parameters. Such parameters may include, for instance, lyrics, key or "target key", genre, chord progression, melodies, etc.

Next, the process may transpose (at 560) the media selection to the base key. Such transposition may include, for instance, transferring single notes and/or chords to the corresponding notes and/or chords of a different key. For example, songs played on a keyboard may be transposed to a base key of C as this only requires use of the white keys. In some cases, the base key may depend on the level of the user. For instance, a beginner may play all tunes in the key of C on keyboard, while an intermediate or advanced player may play tunes in multiple keys. As another example, a singer with limited range (and/or skill) may select a base key that best fits the capabilities of the singer while an advanced singer may utilize other base keys as appropriate.

By transposing the selection to a base key, some embodiments are able to provide a consistent interface (e.g., a set of colors where each color represents a chord or other group of notes), such that users may play multiple tunes of any original key while using the same sets of control elements, as designated by the matching colors. In addition, although a particular base key may be used (e.g., C major) different notes (than C) within the key may serve as roots to allow additional variations. As one example, A minor shares the same notes as C major.

After transposing (at 560) the media item to the base key, the process may link (at 570) the transposed content to the lyrics (and/or other visual cues). The lyrics may be examined to determine chord change points and the color of the lyrical text be set to the appropriate chord representation. Alternatively and/or conjunctively, other indicators may be used (e.g., colored boxes, bubbles, etc.). In addition, various references may be provided (e.g., a moving timeline, a ball that bounces along lyric text, a metronome or drum beat, etc.). Some embodiments may generate a reduced version of the original media content (e.g., keyboard and singing elements may be eliminated while other instruments are included).

The media content may be otherwise manipulated and/or synchronized to the playback cues. Some embodiments may include video or other graphical representations of the various instrument control elements, where the representations are synchronized to the timeline or other progress indicator. For instance, a top view of the set of labelled keys may be presented where the active keys are highlighted (e.g., via color change, movement, etc.) such that a player can follow the movements of the keys as associated with the displayed colors.

If the process determines (at 540) that the selected media has been previously processed, the process may retrieve (at 580) the interactive playable media. After retrieving (at 580) or generating (at 550-570) the media, the process may provide (at 590) the media to the user and then may end. The media may be provided using an interface such as GUI 400 described above.

One of ordinary skill in the art will recognize that process 500 may be performed in various appropriate ways without departing from the scope of the disclosure. For instance, various operations may be omitted, other operations may be included, and/or the operations may be performed in a different order than shown. As another example, the process may be divided into various sub-processes and/or included in a macro process. Some or all of the operations may be performed iteratively, as appropriate.

V. Usage Scenarios

There are many variations and use of this disclosure to inspire and support advanced musical skills. Because the system supports the melody as a way of accompaniment, a user is allowed to work with and/or create a variety of styles. These styles are limited only by the imagination and creativity of the user.

Using the colors, a user may determine how the triads are pronounced. For instance, a user may add a rhythm pattern or change the tempo at the verse or otherwise vary the performance to suit the style and taste of the user.

Users are able to utilize the system of some embodiments to memorize and/or create a structure for an original tune. The system may be able to support and create vocal riffs, unique melodies or implement other melodies onto a progression pattern.

Some embodiments may support the use of two songs within one key structure, commonly known as a "mash up". Two different songs that have similar chord progressions and tempo may be used to create two distinct recognizable melodies in one song. This system supports the process of combination and encourages user exploration of further musicality.

Some embodiments allow creation of an original tune using simplified triad tools, thus enabling music creators by requiring one less task to master. While determining a root foundation in conjunction with a melody, a music composer is able to allow one component to remain free and easy while strategizing the other facet of music construction. The color coded decals on the keyboard encourage the creator to test and explore different musical directions with the ease of color options. This process can inspire melodies or facilitate the natural creation of melodies, composition, direction, and/or chord progression.

VI. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be able to perform functions and/or features that may be associated with various software elements described throughout.

Figure 6:
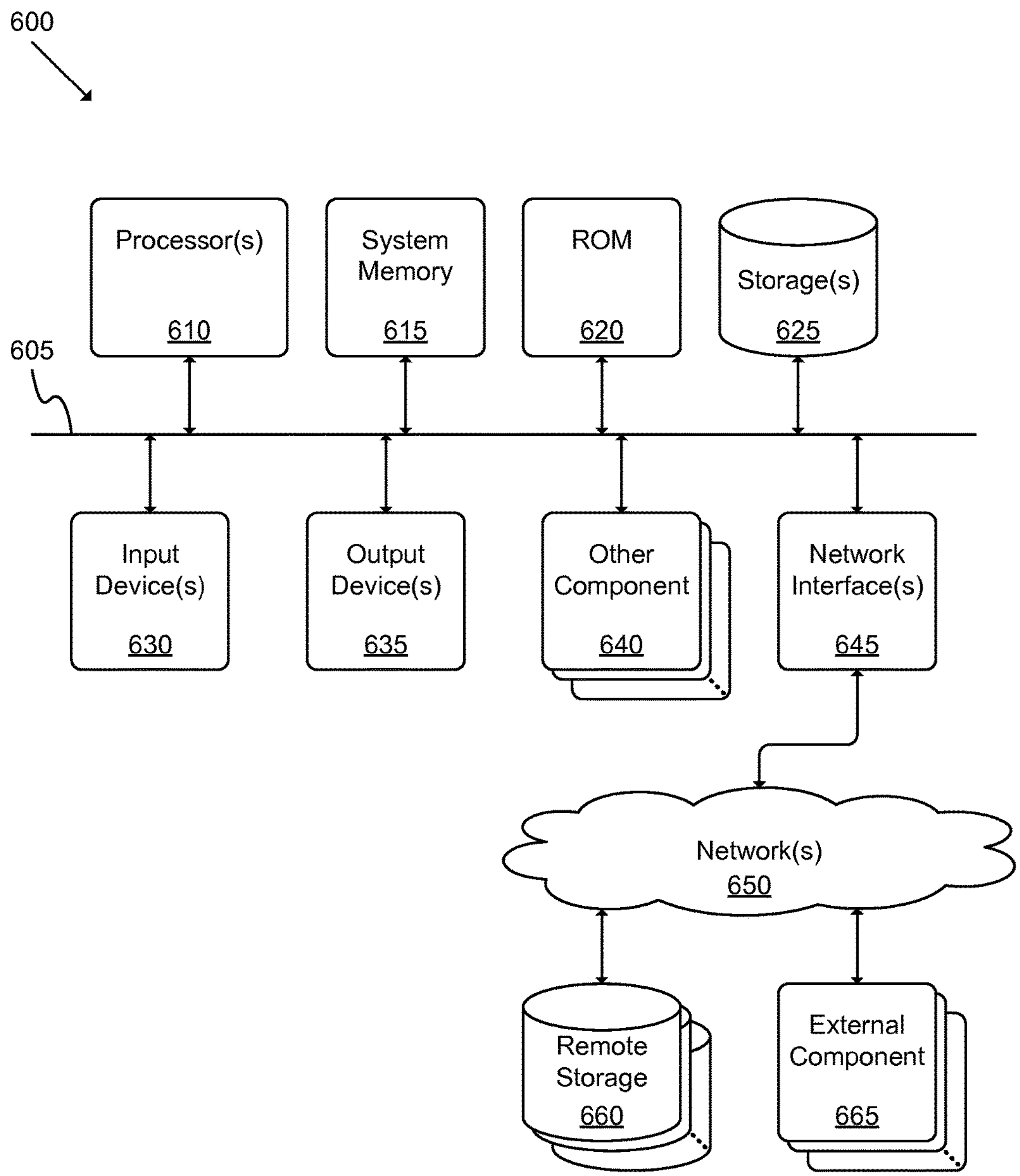
FIG. 6 illustrates a schematic block diagram of an exemplary computer system used to implement some embodiments.

FIG. 6 illustrates a schematic block diagram of an exemplary computer system 600 used to implement some embodiments. For example, the system described above in reference to FIG. 3 may be at least partially implemented using computer system 600. As another example, the GUI described in reference to FIG. 4 and the process described in reference to FIG. 5 may be at least partially implemented using sets of instructions that are executed using computer system 600.

Computer system 600 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 600 may include at least one communication bus 605, one or more processors 610, a system memory 615, a read-only memory (ROM) 620, permanent storage devices 625, input devices 630, output devices 635, various other components 640 (e.g., a graphics processing unit), and one or more network interfaces 645.

Bus 605 represents all communication pathways among the elements of computer system 600. Such pathways may include wired, wireless, optical, and/or other appropriate communication pathways. For example, input devices 630 and/or output devices 635 may be coupled to the system 600 using a wireless connection protocol or system.

The processor 610 may, in order to execute the processes of some embodiments, retrieve instructions to execute and/or data to process from components such as system memory 615, ROM 620, and permanent storage device 625. Such instructions and data may be passed over bus 605.

System memory 615 may be a volatile read-and-write memory, such as a random access memory (RAM). The system memory may store some of the instructions and data that the processor uses at runtime. The sets of instructions and/or data used to implement some embodiments may be stored in the system memory 615, the permanent storage device 625, and/or the read-only memory 620. ROM 620 may store static data and instructions that may be used by processor 610 and/or other elements of the computer system.

Permanent storage device 625 may be a read-and-write memory device. The permanent storage device may be a non-volatile memory unit that stores instructions and data even when computer system 600 is off or unpowered. Computer system 600 may use a removable storage device and/or a remote storage device as the permanent storage device.

Input devices 630 may enable a user to communicate information to the computer system and/or manipulate various operations of the system. The input devices may include keyboards, cursor control devices, audio input devices and/or video input devices. Output devices 635 may include printers, displays, and/or audio devices. Some or all of the input and/or output devices may be wirelessly or optically connected to the computer system.

Other components 640 may perform various other functions. These functions may include performing specific functions (e.g., graphics processing, sound processing, etc.), providing storage, interfacing with external systems or components, etc.

Finally, as shown in FIG. 6, computer system 600 may be coupled to one or more networks 650 through one or more network interfaces 645. For example, computer system 600 may be coupled to a web server on the Internet such that a web browser executing on computer system 600 may interact with the web server as a user interacts with an interface that operates in the web browser. Computer system 600 may be able to access one or more remote storages 660 and one or more external components 665 through the network interface 645 and network 650. The network interface(s) 645 may include one or more application programming interfaces (APIs) that may allow the computer system 600 to access remote systems and/or storages and also may allow remote systems and/or storages to access computer system 600 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 600 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the spirit and scope of the disclosure as defined by the following claims.

I claim:

1. A musical instrument keyboard labelling kit for a keyboard having diatonic keys and accidental keys, the labelling kit comprising:

a set of bass key labels associated with a set of diatonic bass keys, each bass key label including a bass key label visual indicator that is distinct from each other bass key label visual indicator; and a set of harmony key labels comprising harmony diatonic key labels and harmony accidental key labels, each harmony key label including a set of harmony key label visual indicators, wherein each harmony key label visual indicator in the set of harmony key label visual indicators is distinct from each other harmony key label visual indicator in the set of harmony key label visual indicators, wherein each of the set of harmony key label visual indicators has a matching bass key label visual indicator of said bass key label from the set of bass key labels, and wherein a plurality of harmony key labels from the set of harmony key labels has a matching visual indicator as each bass key label visual indicator such that a plurality of harmony key labels from the set of harmony key labels is associated with each bass key label from the set of bass key labels, wherein each diatonic key across a first octave is associated with a different bass key label from the set of bass key labels, each diatonic key across a second octave is associated with a different harmony diatonic key label from the set of harmony key labels, and each of a plurality of accidental keys across the first octave and the second octave is associated with a different harmony accidental key label from the set of harmony key labels, wherein each harmony diatonic key label from the set of harmony key labels for labelling each diatonic key across said second octave is associated with a plurality of bass key labels from the set of bass key labels for labelling each diatonic key across said first octave.

2. The musical instrument keyboard labelling kit of claim 1, wherein the bass key label visual indicators and the harmony key label visual indicators include colors.

3. The musical instrument keyboard labelling kit of claim 2, wherein each color associated with a bass key label is associated with a plurality of harmony key labels.

4. The musical instrument keyboard labelling kit of claim 3, wherein notes associated with the bass key label and the plurality of harmony key labels form a triad.

5. The musical instrument keyboard labelling kit of claim 1, wherein each bass key label visual indicator comprises an ellipse.

6. The musical instrument keyboard labelling kit of claim 1, wherein each harmony key label visual indicator in the set of harmony key label visual indicators comprises a rectangle.

7. The musical instrument keyboard labelling kit of claim 1, wherein each bass key label corresponds to a different note included in a major scale.

* * * * *